(12) United States Patent
Weingarten

(10) Patent No.: US 10,788,056 B2
(45) Date of Patent: Sep. 29, 2020

(54) PILOT VALVE ASSEMBLY WITH ORIENTATION ADJUSTMENT

(71) Applicant: BERMAD CS LTD., Kibbutz Evron (IL)

(72) Inventor: Zvi Weingarten, Kibbutz Evron (IL)

(73) Assignee: Bermad CS Ltd., Kibbutz Evron (IL)

( * ) Notice: Subject to any disclaimer, the term of this patent is extended or adjusted under 35 U.S.C. 154(b) by 98 days.

(21) Appl. No.: 16/104,259

(22) Filed: Aug. 17, 2018

(65) Prior Publication Data

US 2020/0056633 A1 Feb. 20, 2020

(51) Int. Cl.
| | |
|---|---|
| *F15B 11/05* | (2006.01) |
| *F15B 11/028* | (2006.01) |
| *F15B 13/043* | (2006.01) |
| *F15B 11/042* | (2006.01) |
| *F16K 27/02* | (2006.01) |
| *F16K 31/40* | (2006.01) |
| *F15B 15/20* | (2006.01) |
| *F15B 13/02* | (2006.01) |
| *F15B 13/00* | (2006.01) |
| *F15B 15/10* | (2006.01) |

(52) U.S. Cl.
CPC ............ *F15B 11/05* (2013.01); *F15B 11/028* (2013.01); *F15B 11/042* (2013.01); *F15B 13/043* (2013.01); *F15B 15/202* (2013.01); *F16K 27/029* (2013.01); *F16K 27/0281* (2013.01); *F16K 31/404* (2013.01); *F15B 13/025* (2013.01); *F15B 15/10* (2013.01); *F15B 2013/006* (2013.01)

(58) Field of Classification Search
CPC ....... F15B 11/05; F15B 11/028; F15B 11/042; F15B 13/043; F15B 13/025; F15B 15/10; F15B 15/202; F15B 2013/006; F16K 27/0281; F16K 27/029; F16K 31/404; Y10T 137/7768; Y10T 137/7769
USPC ...... 137/489.5, 492; 251/30.01, 30.02, 30.03
See application file for complete search history.

(56) References Cited

U.S. PATENT DOCUMENTS

| | | | | |
|---|---|---|---|---|
| 2,377,227 | A | * 5/1945 | Griswold | F16K 31/385 |
| | | | | 251/25 |
| 3,439,895 | A | * 4/1969 | Marandi | F16K 31/402 |
| | | | | 251/30.02 |
| 4,081,171 | A | * 3/1978 | Morgan | B01D 35/04 |
| | | | | 137/549 |
| 4,180,236 | A | * 12/1979 | Saarem | F16K 31/402 |
| | | | | 251/30.02 |

(Continued)

*Primary Examiner* — William M McCalister
(74) *Attorney, Agent, or Firm* — Mark M. Friedman

(57) ABSTRACT

A pilot valve assembly (10) includes a cylindrical connector (12) having a first end portion (16) with external threading (18) for engaging a threaded control socket (106) of a hydraulic valve (100), and a second end (20) with an array of teeth (22) arrayed around its edge. A circumferential slot (24) around connector (12) is spaced from second end (20). The assembly also includes a pilot valve (26) with a mechanism for controlling a pressure within the hydraulic control valve actuator chamber. Pilot valve (26) is formed with a recess (28) having a complementary teeth (30) for engaging teeth (22) of connector (12) in a range of angular orientations. A clamping arrangement engages slot (24) and clamps pilot valve (26) to second end (20) of connector (12), thereby fixing an angular orientation of the pilot valve.

9 Claims, 9 Drawing Sheets

(56) References Cited

U.S. PATENT DOCUMENTS

| | | | | |
|---|---|---|---|---|
| 4,226,259 A * | 10/1980 | Szekely | F16K 31/365 137/269 |
| 4,360,037 A * | 11/1982 | Kendall | B01D 25/38 137/242 |
| 4,893,645 A * | 1/1990 | Augustinas | F16K 31/402 137/315.03 |
| 5,996,608 A * | 12/1999 | Hunter | F16K 31/402 137/244 |
| 6,394,413 B2 * | 5/2002 | Lohde | F16K 31/402 251/129.03 |
| 7,694,934 B2 * | 4/2010 | Irwin | F16K 31/402 137/242 |
| 7,806,382 B1 * | 10/2010 | Palumbo | F16K 31/402 251/30.03 |
| 8,490,646 B2 * | 7/2013 | Bush | E03D 3/06 137/487.5 |
| 8,740,177 B2 * | 6/2014 | Walker | F16K 7/17 251/30.01 |
| 9,539,674 B2 * | 1/2017 | Walker | F16K 31/402 |
| 2002/0148991 A1 * | 10/2002 | Herbert | F16K 7/14 251/30.02 |
| 2005/0189506 A1 * | 9/2005 | Lee | F16K 31/402 251/30.01 |
| 2006/0076061 A1 * | 4/2006 | Bush | E03D 5/02 137/489.5 |
| 2009/0095935 A1 * | 4/2009 | Wlodarczyk | F16K 31/402 251/331 |
| 2009/0101855 A1 * | 4/2009 | Nguyen | F16K 31/402 251/120 |
| 2012/0145099 A1 * | 6/2012 | Kato | F15B 15/12 123/90.15 |
| 2015/0337524 A1 * | 11/2015 | Bush | G05D 16/2095 73/37 |
| 2020/0056633 A1 * | 2/2020 | Weingarten | F16K 27/0281 |

* cited by examiner

PILOT VALVE ASSEMBLY WITH ORIENTATION ADJUSTMENT

FIELD AND BACKGROUND OF THE INVENTION

The present invention relates to hydraulic control valves for controlling fluid flow and, in particular, it concerns a pilot valve assembly for use with such hydraulic control valves.

It is known to employ a pilot valve assembly to provide a control pressure to an actuator chamber of a hydraulic control valve. Various different operating principles are known for pilot valves to achieve various different types of control, including but not limited to: pressure reduction, pressure sustaining, flow rate limiting, etc. Pilot valves are typically responsive to upstream pressure and/or downstream pressure, and are in flow connection with the actuator chamber of the hydraulic control valve. These various functions are often effected using connecting tubing that is external to the body of the hydraulic control valve and the pilot valve. In other cases, specially designed valve assemblies may combine a hydraulic control valve with a pilot valve in a combination housing.

In certain cases, hydraulic control valves may be designed for simple on-off remote control functionality. One such option employs a hydraulic control valve in which a cover encloses an actuator chamber, and the cover has a threaded control socket that provides access to flow channels in fluid flow connection with the actuator chamber of the hydraulic control valve and a downstream connection of the hydraulic control valve. The threaded control socket is preferably configured to receive a standard solenoid valve controller, and allows selective opening and closing of a flow channel that is effective to switch the control valve between two states.

SUMMARY OF THE INVENTION

The present invention is a pilot valve assembly for connection to a hydraulic control valve.

According to the teachings of an embodiment of the present invention there is provided, a pilot valve assembly for connection to a hydraulic control valve, the hydraulic control valve having a cover at least partially enclosing an actuator chamber, the cover having a threaded control socket that provides access to flow channels in fluid flow connection with the actuator chamber of the hydraulic control valve and a downstream connection of the hydraulic control valve, the pilot valve assembly comprising: (a) a connector comprising a generally cylindrical body surrounding an internal passageway that extends parallel to an axis of the body, a first end portion of the connector being formed with external threading for engaging the threaded control socket of the hydraulic control valve, a second end of the connector being provided with an array of teeth arrayed around an edge of the second end, a circumferential slot being formed in an external surface of the connector spaced from the second end; (b) a pilot valve comprising a mechanism for controlling a pressure within the hydraulic control valve actuator chamber, the pilot valve having a recess configured to mate with the second end of the connector, the recess having a plurality of complementary teeth configured for engaging the array of teeth of the connector in a plurality of angular orientations; and (c) a clamping arrangement for engaging the circumferential slot so as to clamp the pilot valve to the second end of the connector with the complementary teeth engaged with the array of teeth, thereby fixing an angular orientation of the pilot valve.

According to a further feature of an embodiment of the present invention, the clamping arrangement comprises a forked wedge having two wedge tines for insertion through guide channels formed in the pilot valve so that the wedge tines engage the circumferential slot and progressively tighten the pilot valve against the second end of the connector.

According to a further feature of an embodiment of the present invention, the array of teeth are deployed on an axially-facing end surface of the second end of the connector and project axially.

According to a further feature of an embodiment of the present invention, the pilot valve further comprises a connector tube projecting from the recess and configured to extend through the internal passageway of the connector to connect to an aperture of the hydraulic control valve control flow path.

According to a further feature of an embodiment of the present invention, the pilot valve is a pressure-reducing pilot valve configured to control a pressure within the hydraulic control valve actuator chamber as a function of at least a pressure from the downstream connection.

According to a further feature of an embodiment of the present invention, the pilot valve is configured to throttle a flow path from the hydraulic control valve actuator chamber to the downstream connection as a function of at least a pressure in the downstream connection.

According to a further feature of an embodiment of the present invention, the pilot valve is configured to switch a flow path to the hydraulic control valve actuator chamber between a first state connected to an upstream connection, a second state preventing flow, and a third state for venting pressure from the hydraulic control valve actuator chamber.

According to a further feature of an embodiment of the present invention, the pilot valve is a diaphragm pilot valve.

According to a further feature of an embodiment of the present invention, the pilot valve comprises a spring-biased diaphragm biased by a spring, and a spring adjustment mechanism for varying a loading applied to the spring.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
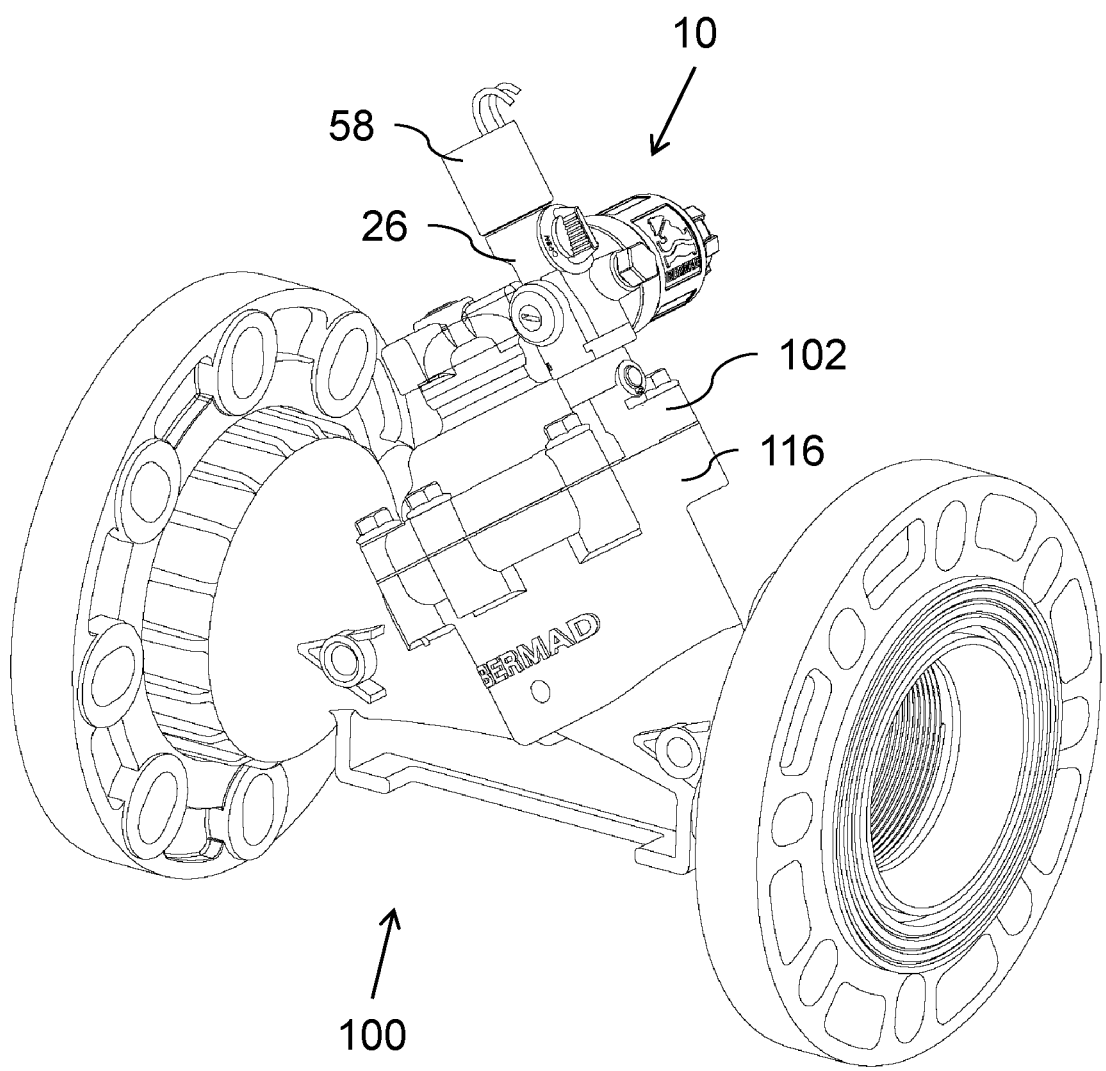
FIG. 1 is an isometric view of a hydraulic control valve fitted with a pilot valve assembly, constructed and operative according to an embodiment of the present invention.

The present invention is a pilot valve assembly for connection to a hydraulic control valve.

The principles and operation of pilot valve assemblies according to the present invention may be better understood with reference to the drawings and the accompanying description.

Referring now to the drawings, FIGS. 1-10 show various implementations of a pilot valve assembly 10, constructed and operative according to the teachings of certain embodiments of the present invention, for connection to a hydraulic valve 100. The invention is particularly applicable to hydraulic control valves 100 having a cover 102 at least partially enclosing an actuator chamber 104, where cover 102 has a threaded control socket 106 that provides access to flow channels 108 and 110 that are in fluid flow connection with actuator chamber 104 and a downstream connection 112 of hydraulic control valve 100, respectively.

Certain particularly preferred implementations of the pilot valve assembly 10 include a connector 12, best seen in FIGS. 4A-5, 6B and 9B, having a generally cylindrical body surrounding an internal passageway 14 that extends parallel to an axis of the body. A first end portion 16 of connector 12 is formed with external threading 18 for engaging the threaded control socket 106 of hydraulic control valve 100. A second end 20 of the connector is provided with an array of teeth 22 arrayed around an edge of second end 20. A circumferential slot 24 is formed in an external surface of connector 12 spaced from second end 20.

Pilot valve assembly 10 also includes a pilot valve 26 that includes a mechanism for controlling a pressure within the hydraulic control valve actuator chamber. Pilot valve 26 is formed with a recess (see FIG. 5) configured to mate with second end 20 of connector 12. Recess 28 has a plurality of complementary teeth 30 configured for engaging teeth 22 of connector 12 in any of a plurality of angular orientations.

A clamping arrangement is also provided for engaging circumferential slot 24 so as to clamp pilot valve 26 to second end 20 of connector 12 with complementary teeth 30 engaged with array of teeth 22, thereby fixing an angular orientation of the pilot valve.

At this stage, it will already be appreciated that certain preferred embodiments of the present invention provide highly advantageous modularity and convenience. Specifically, by use of connector 12, it is possible to employ various types of pilot valve by direct connection to a standard threaded control socket of a standard hydraulic control valve, and with a reduced requirement, or even no requirement, for external tubing. The engagement configuration between the pilot valve 26 and connector 12 allows selection of an angular orientation which is compatible with the structure of both the hydraulic control valve 100 and the pilot valve 26, and any other adjacent installed components, and then fixing of that orientation using the clamping arrangement, preferably without requiring rotational motion of the pilot valve during clamping. A selection of such possible orientations are illustrated schematically, superimposed on each other, in FIG. 7, as orientations A, B, C and D. These and other advantages of various embodiments of the present invention will be better understood by reference to the following description and accompanying drawings.

Figure 2:
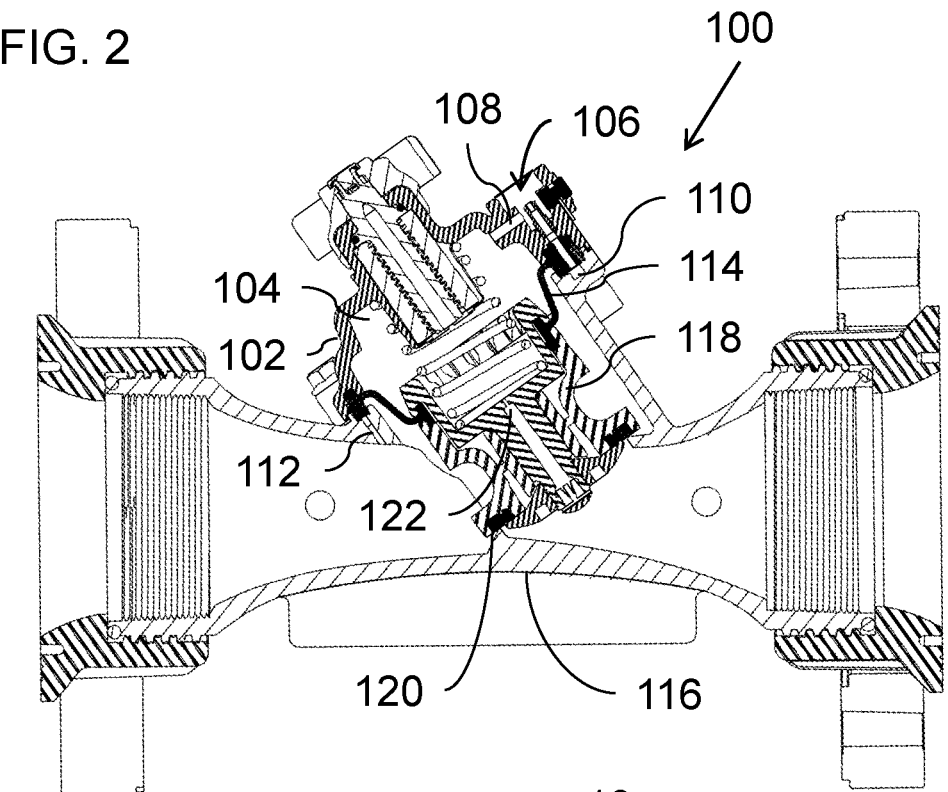
FIG. 2 is a longitudinal cross-sectional view taken through the hydraulic control valve of FIG. 1 prior to attachment of the pilot valve assembly.
Figure 3:
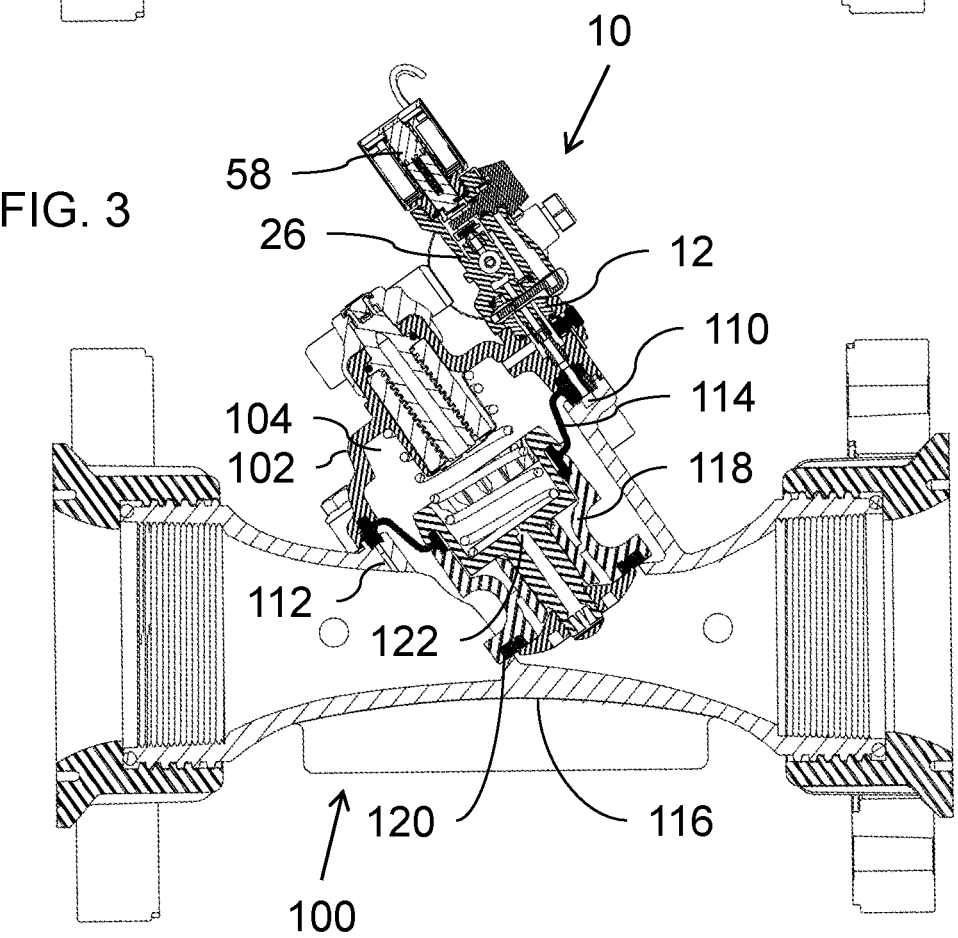
FIG. 3 is a longitudinal cross-sectional view taken through the hydraulic control valve fitted with the pilot valve assembly of FIG. 1.
Figure 4:
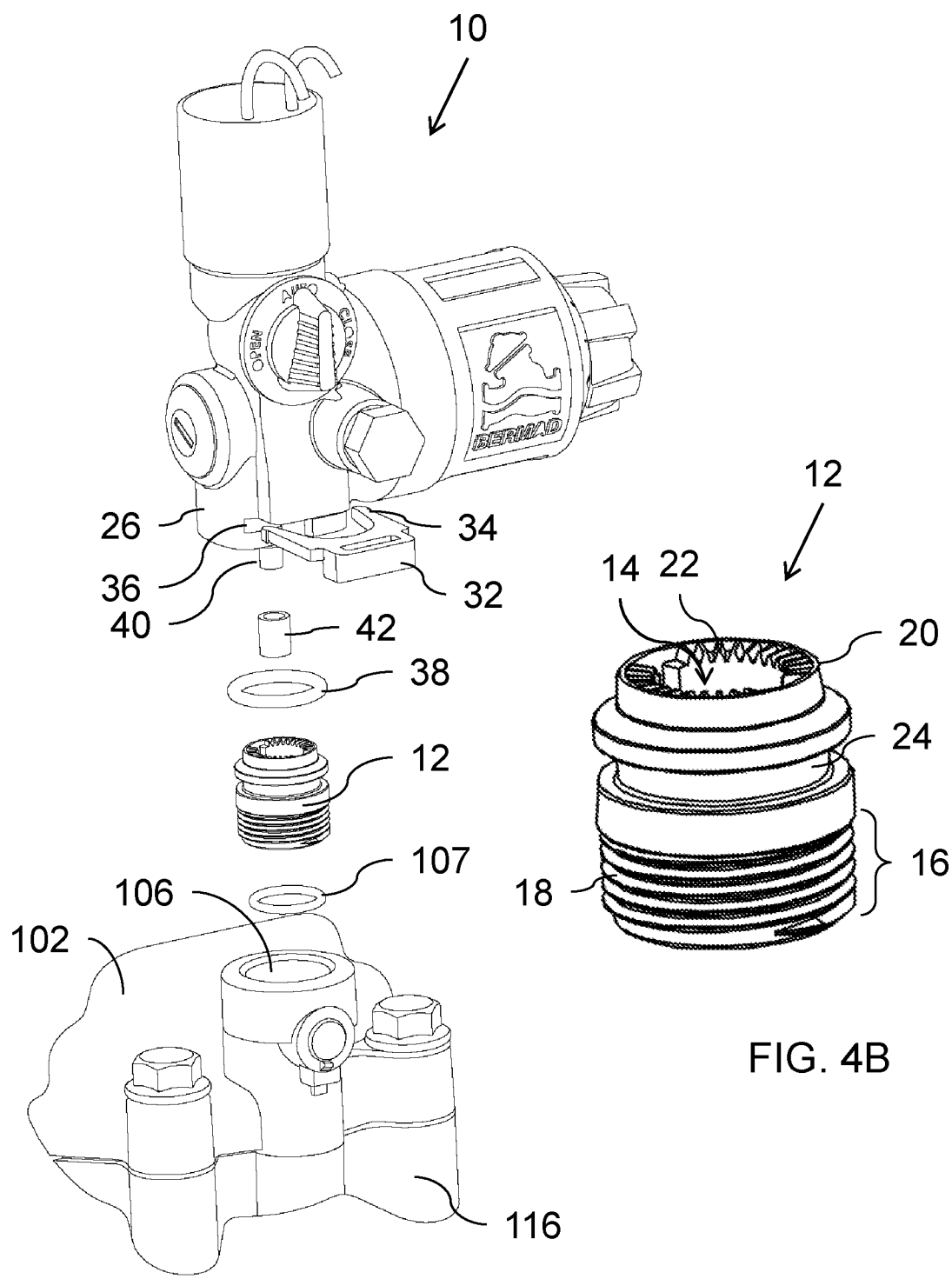
FIG. 4A is an isometric exploded view showing components of the pilot valve assembly, including a connector, together with a region of the hydraulic control valve of FIG. 1.
FIG. 4B is an enlarged isometric view of the connector of FIG. 4A.

Referring now to FIG. 2, the present invention may be implemented in the context of a wide range of hydraulic control valves 100, including but not limited to control valves operated by actuator chamber pressure acting on a flexible diaphragm and control valves operated by actuator chamber pressure acting on a piston. By way of one non-limiting example, FIG. 2 shows a diaphragm valve in which an outer periphery of a flexible diaphragm 114 is clamped between cover 102 and a valve body 116. A plug 118 mounted in the middle of the diaphragm selectively closes against a valve seat 120. In certain cases, depending on the type of pilot valve control used (as discussed further below), a restricted flow path 122 is provided, in this case through a central bore of plug 118, to allow limited flow from an upstream side of the control valve into actuator chamber 104.

It should be noted that a hydraulic control valve 100 as thus described can be operated as an on/off switchable control valve simply by screwing in a standard solenoid actuator (not shown here) into threaded control socket 106. When the solenoid is "open" to allow flow from channel 108 to channel 110, pressure in actuation chamber 104 is released to the downstream side of the control valve with much lower flow impedance than the restricted flow via flow path 122, resulting in low pressure in the actuation chamber and opening of the valve. When the solenoid is switched to its closed state, a sealing element of the solenoid actuator is pressed against the orifice of channel 110 so as to prevent flow from channel 108 to channel 110. Pressure within actuation chamber 104 then increases as the pressure of the upstream side of the valve equalizes across restricted flow path 122 without any path to escape, resulting in increased actuation chamber pressure which (typically with the assistance of a spring) forces plug 118 to its closed position.

The pilot valve assembly of the present invention facilitates conversion of such an on/off valve, typically without modification, to operate under the control of a pilot valve to provide enhanced functionality, simply by connecting a pilot valve via connector 12.

Figures 6A, 6B:
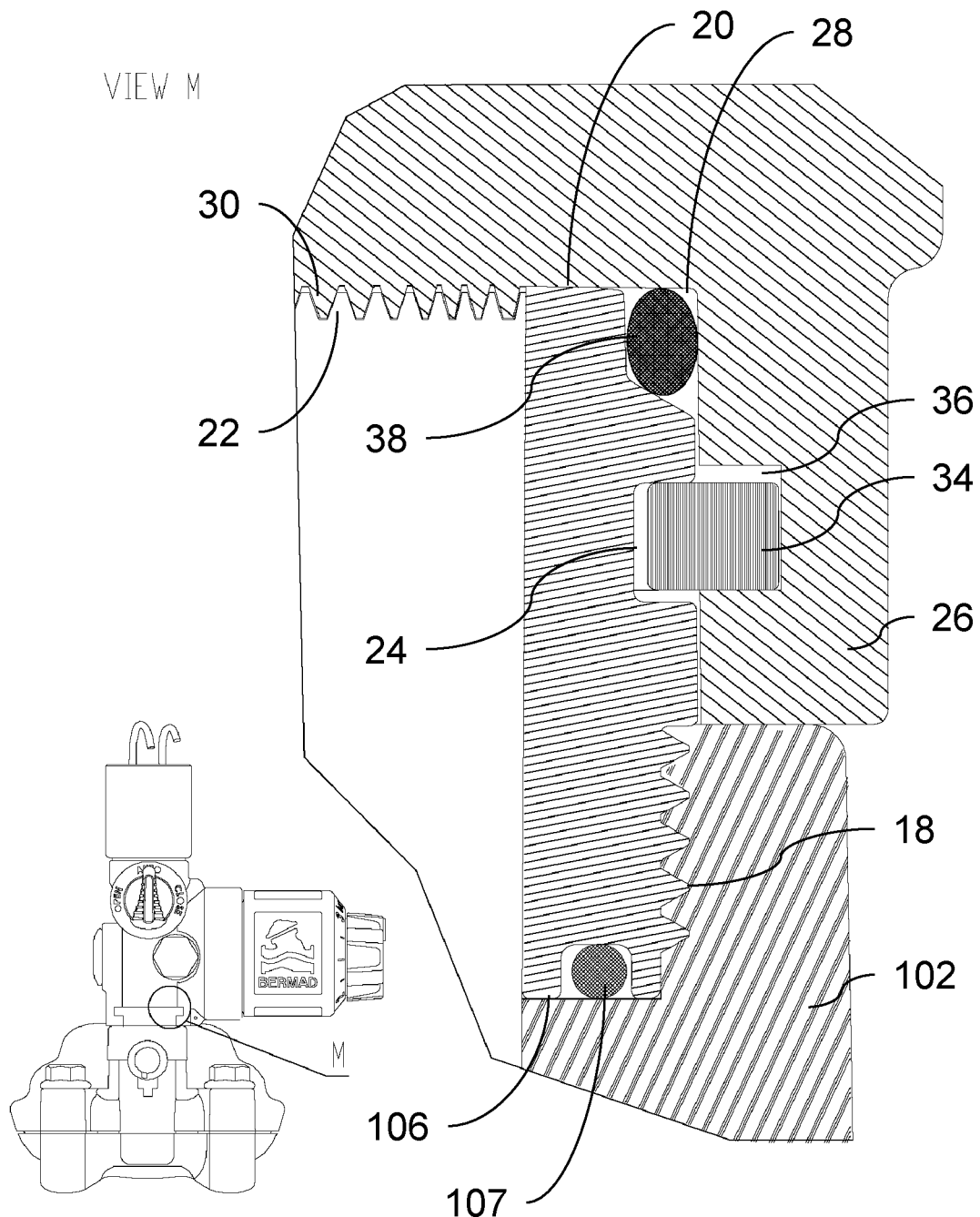
FIG. 6A is a side view of the pilot valve assembly of FIG. 1 together with a part of the hydraulic control valve, where a region "M" is marked with a circle.
FIG. 6B is a partial cross-sectional view taken in a plane parallel to a central axis of the connector of the pilot valve assembly, taken in the region "M" of FIG. 6A, illustrating operation of a wedge-based clamping mechanism.
Figure 7:
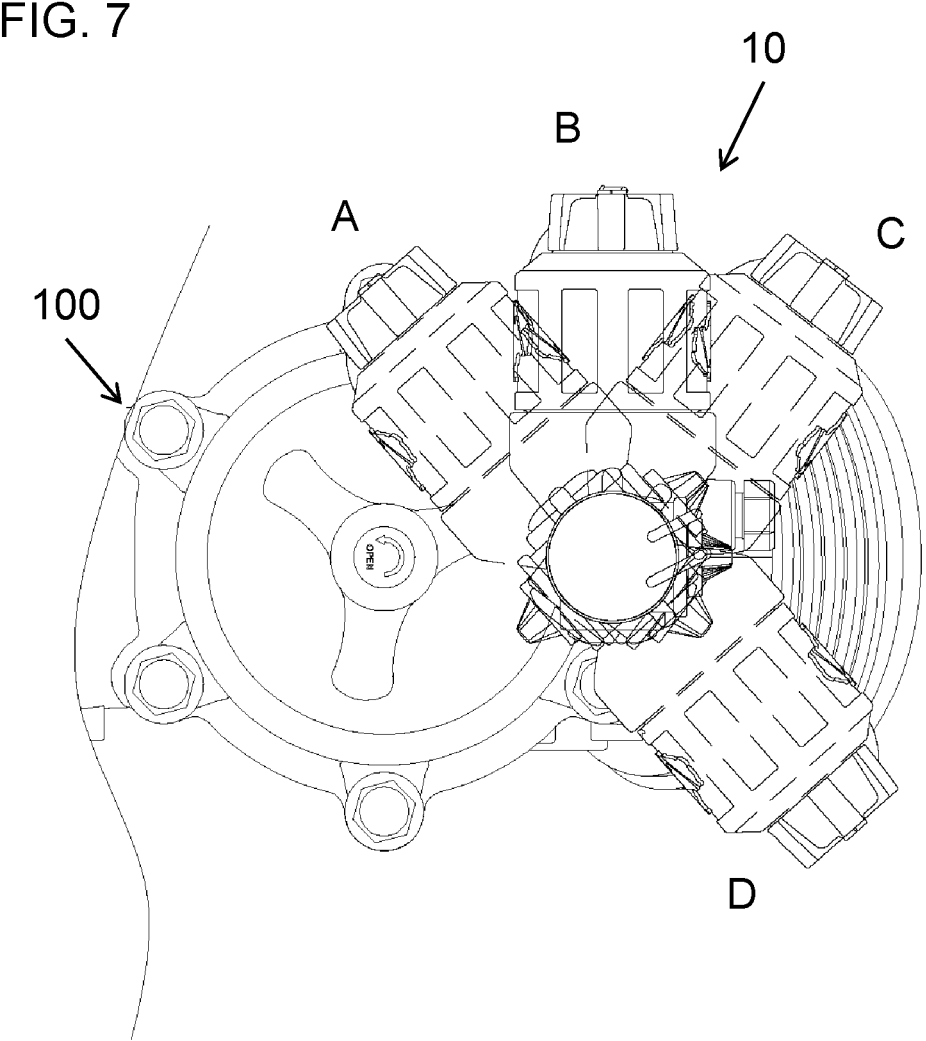
FIG. 7 is a schematic plan view of the pilot valve assembly of FIG. 1 together with a part of the hydraulic control valve, showing the pilot valve located in a range of different angular orientations marked with reference letters A-D.

Connection of connector 12 to threaded control socket 106 is preferably via a standard threaded engagement, typically enhanced by an O-ring seal 107 which may be seated in a corresponding annular recess best seen in FIG. 6B, making the connector interchangeable with a solenoid actuator. After connector 12 has been installed in socket 106, a desired orientation for pilot valve 26 is chosen, and it is brought into engagement with the connector 12 so that the complementary teeth 22 and 30 are juxtaposed, and start to inter-engage. At this point, the orientation can still be adjusted easily. Once the position has been decided, the clamping arrangement is used to firmly engage the complementary teeth 22 and 30, and to fasten pilot valve 26 to connector 12.

A range of different clamping arrangements may be used to tighten engagement between the pilot valve and the connector and to fasten them together. These may include all sorts of clips, clasps, clamps, toggle mechanisms or the like. According to one particularly simple and effective non-limiting example illustrated here, the clamping arrangement includes a forked wedge 32 having two wedge tines 34 for insertion through guide channels 36 formed in the pilot valve 26 so as to intersect recess 28 aligned with circumferential slot 24. A wedge angle of wedge tines 34 and the alignment of guide channels 36 are preferably chosen such that, as the wedge tines advance, the tines progressively tighten pilot valve 26 against second end 20 of connector 12. The tightening effect is best illustrated in the partial, enlarged cross-sectional view of FIG. 6B, where wedge tine 34 is seen to be pressing one side of circumferential slot 24 and the opposite side of guide channel 36 so as to bias the connector against the innermost surface of recess 28.

In the particularly preferred option illustrated here, the array of teeth 22 are deployed on an axially-facing end surface of second end 20 of connector 12, and the teeth project axially. It should be noted that the term "project" is used here to refer to the crests of the teeth relative to the grooves between them, but that the teeth do not necessarily project beyond the end 20 of the connector. Thus, for example, as shown in FIG. 4B, the teeth may all lie at, or below, the level of a continuous edge defining end 20, which may facilitate forming of a seal against a base of recess 28, enhanced by an O-ring 38.

Figure 5:
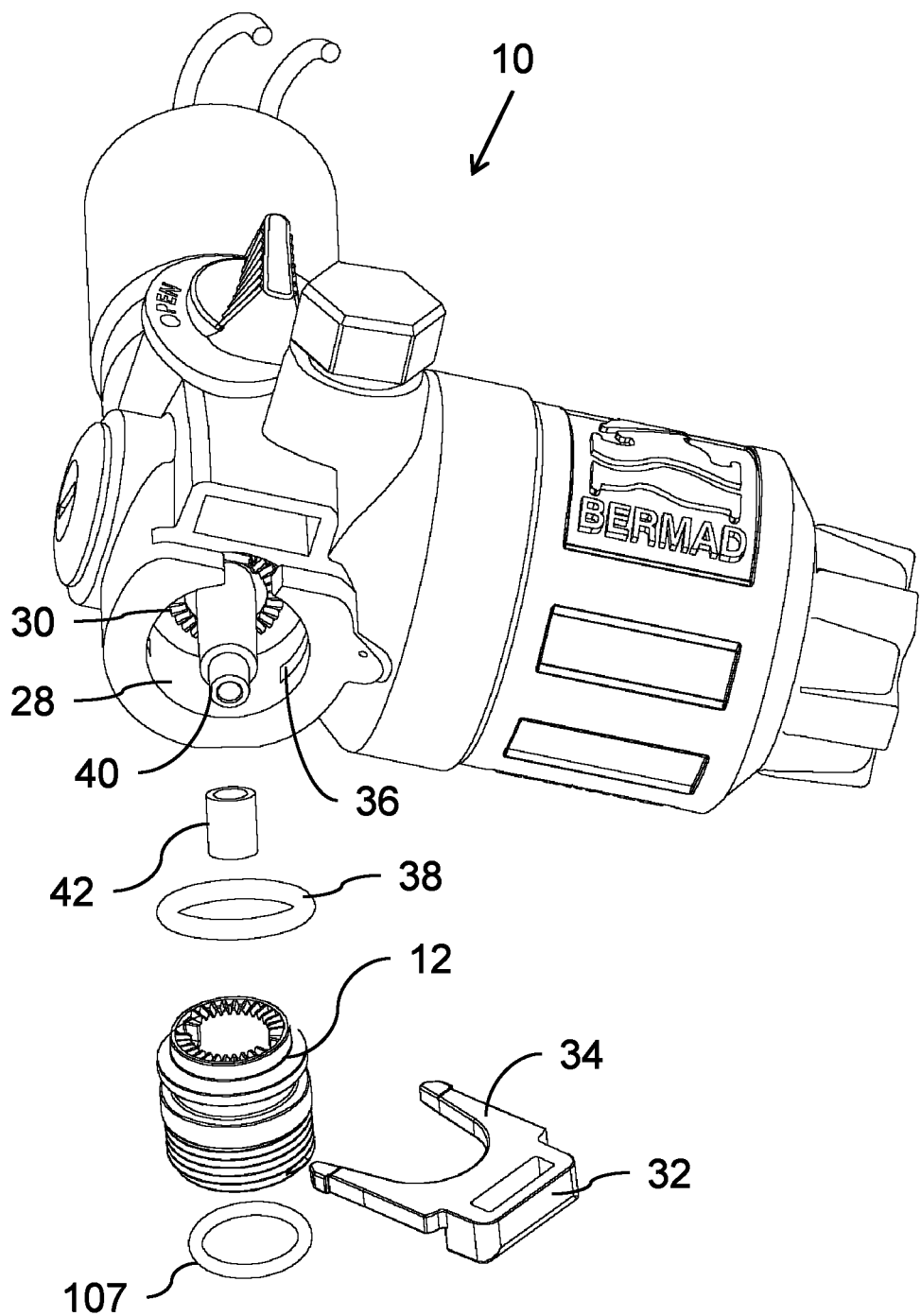
FIG. 5 is an isometric exploded view showing components of the pilot valve assembly of FIG. 1, showing the pilot valve inverted to reveal a structure of a recess for mating with the connector.
Figures 9A, 9B:
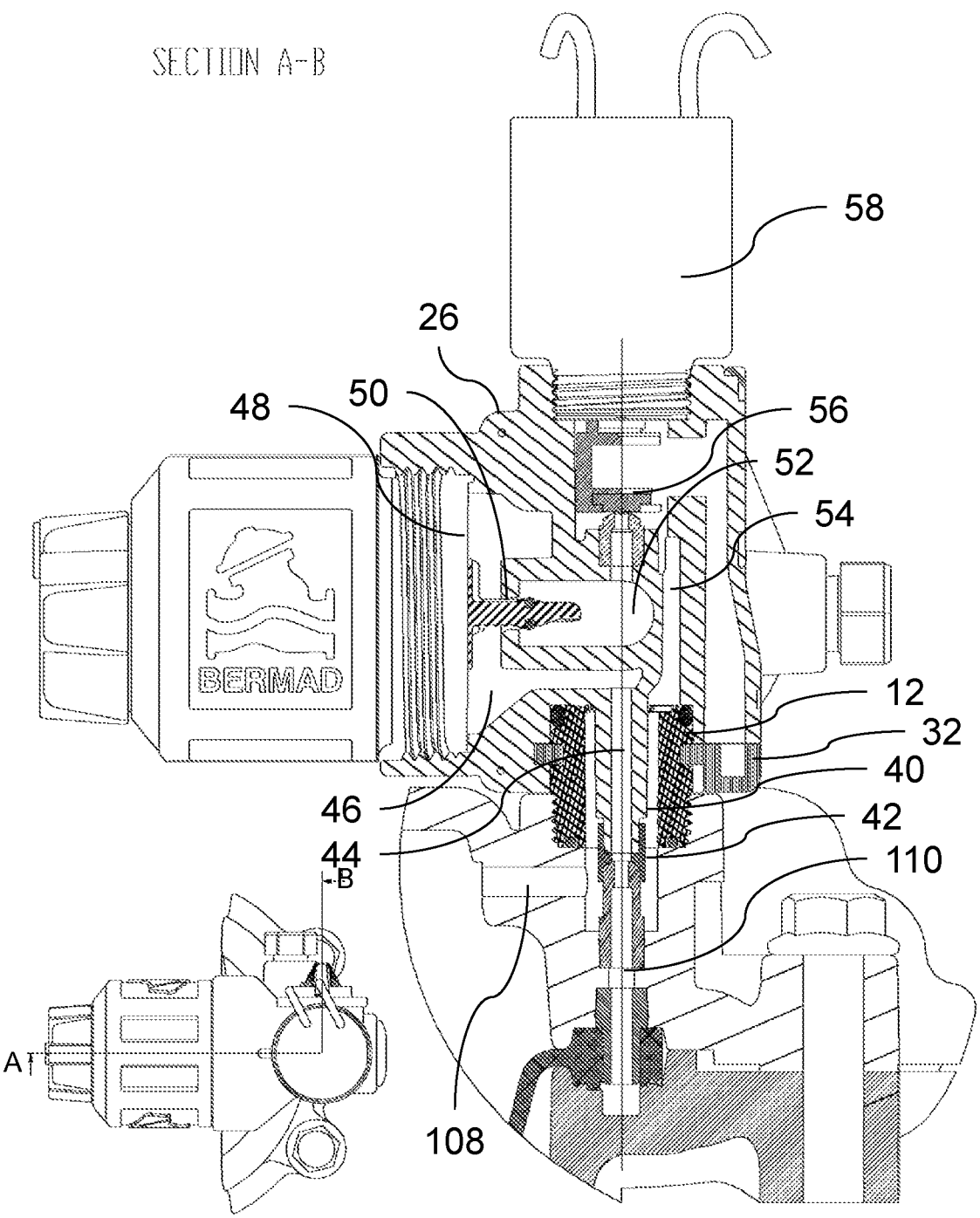
FIG. 9A is a plan view of the pilot valve assembly of FIG. 1 together with a part of the hydraulic control valve, showing line A-B.
FIG. 9B is a cross-sectional view taken along line A-B of FIG. 9A showing an implementation of the pilot valve assembly of FIG. 8.

In various applications of the present invention, pilot valve 26 requires separate flow connections to two flow paths 108 and 110 within threaded control socket 106. This may be achieved either by providing connector 12 with internal structure (not shown) to define two distinct flow paths through the connector or, as illustrated in FIGS. 5 and 9B, by providing a connector tube 40 projecting from recess 28 and configured to extend through the internal passageway of connector 12 to connect to an aperture associated with one of the flow paths, in this case, flow path 110. In the structure as illustrated here, a sealing collar 42 facilitates sealed connection of connector tube 40 to flow path 110.

Pilot valve 26 may be designed to implement any desired control scheme and to provide any desired mode of control including, but not limited to, pressure reduction, pressure sustaining, flow rate limiting and other control functions. By way of non-limiting examples, the invention will now be described with reference to pressure reduction pilot valves implementing control modes employing two-way and three-way valve arrangements.

Figure 8:
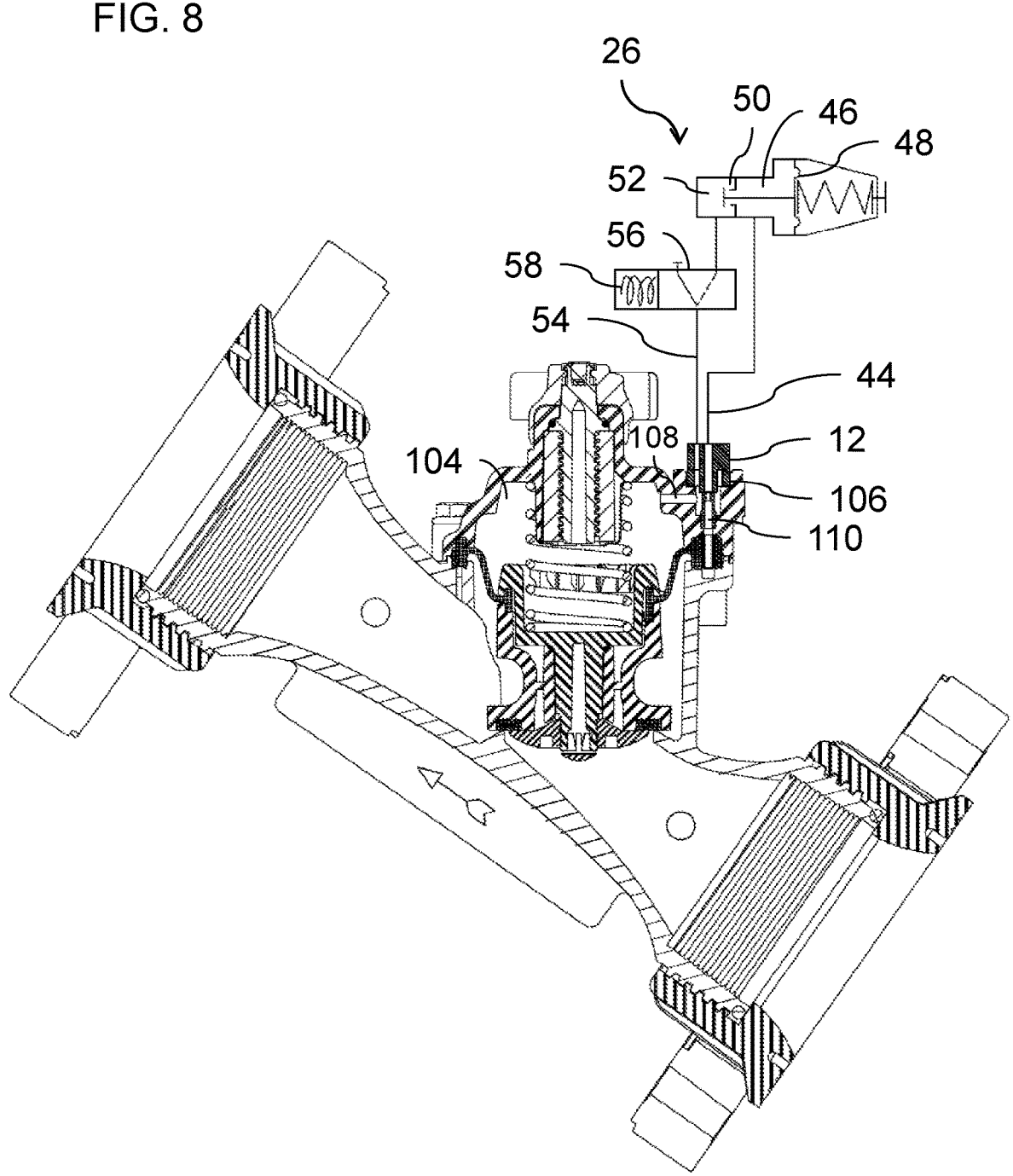
FIG. 8 is a schematic diagram of an implementation of a pilot valve assembly shown schematically in the context of a cross-sectional view of a hydraulic control valve and connector according to an embodiment of the present invention, the pilot valve assembly employing two-way control scheme.

A first example, illustrated schematically in FIG. 8 and in a specific implementation in FIG. 9B, provides a flow connection 44 from the downstream-connected flow path 110 to a pilot actuator chamber 46 whose pressure acts on a spring-biased diaphragm 48 which controls a variable flow restrictor 50. The upstream side of variable flow restrictor 50 is a volume 52 connected via a flow path 54 to the actuator chamber flow path 108. When pressure in the downstream side of the hydraulic control valve as sensed via flow path 110 is low, spring-biased diaphragm 48 keeps variable flow restrictor 50 open, thereby allowing pressure from the actuator chamber 104 to be vented to the downstream side of the valve, resulting in opening of the valve. As the downstream pressure increases, increased pressure in the pilot actuator chamber 46 acts on spring-biased diaphragm 48 to cause progressive throttling of variable flow restrictor 50. Given a restricted flow path from the upstream side of the control valve into the actuator chamber (as described above), throttling of restrictor 50 causes progressive build-up of pressure within the actuator chamber, acting to displace plug 118 towards valve seat 120. This scheme thus provides pressure-regulating functionality for the output. By adjusting a degree of preload in the spring of spring-biased diaphragm 48, the downstream target pressure can be adjusted. Optionally, a solenoid-controlled plug 56 (controlled by solenoid 58) is deployed to selectively obstruct the flow path through the pilot valve, most preferably in flow path 54, thereby allowing remote and/or automated switching between the above-described pressure regulating state and an "off" state in which flow path 54 is blocked, causing closure of the control valve. Plug 56, or another valve plug (not shown) may also have a manual actuation option.

Figure 10:
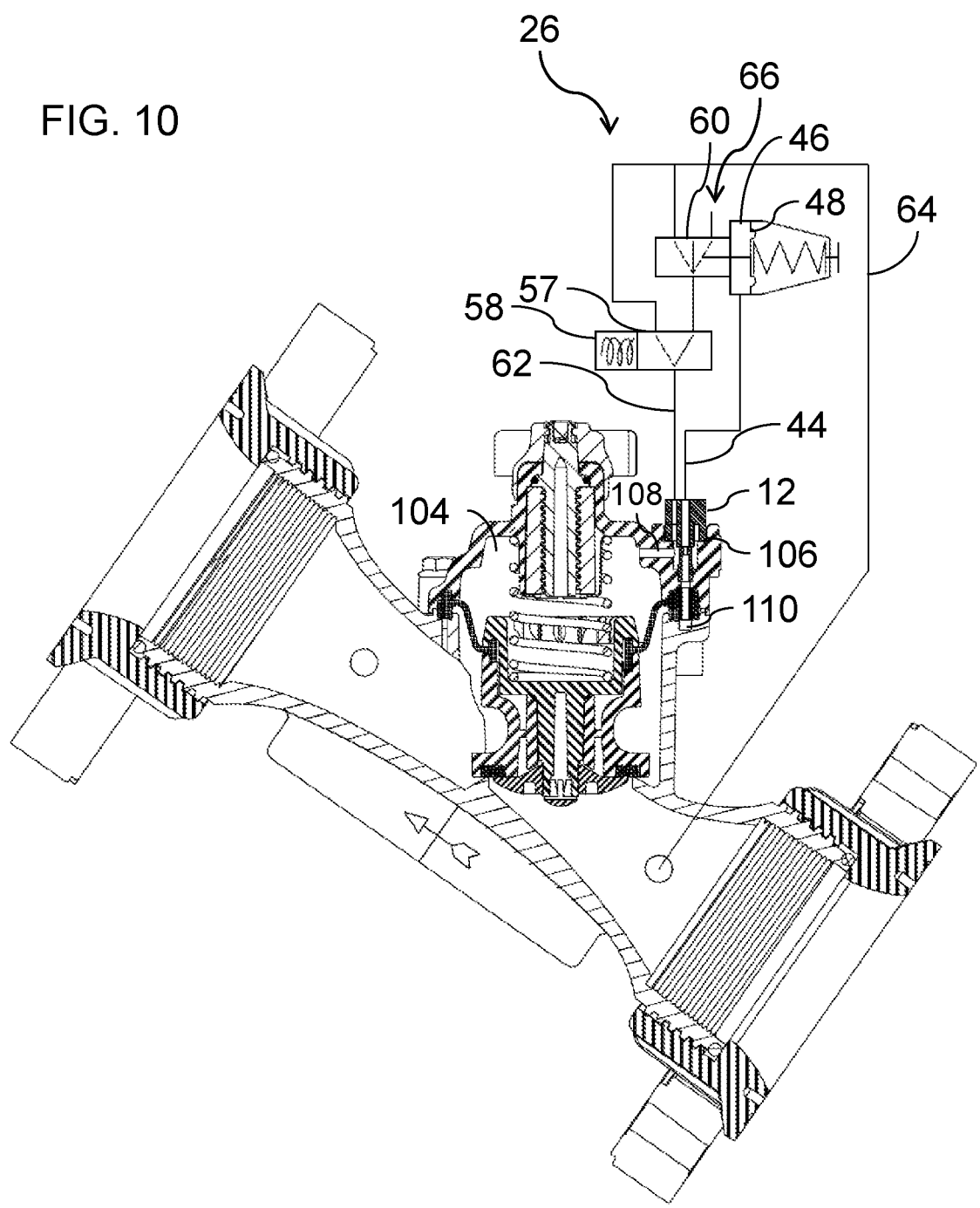
FIG. 10 is a schematic diagram of a further implementation of a pilot valve assembly shown schematically in the context of a cross-sectional view of a hydraulic control valve and connector according to an embodiment of the present invention, the pilot valve assembly employing three-way control scheme.

FIG. 10 illustrates schematically an alternative pilot valve implementation for pressure reduction in which no net flow occurs between the upstream and downstream sides of the control valve via the pilot valve, and where no direct flow path is provided from the upstream fluid supply into the actuator chamber. Here too, a flow connection 44 from the downstream-connected flow path 110 provides the downstream pressure to a pilot actuator chamber 46 in which the pressure acts on a spring-biased diaphragm 48. In this case, spring-biased diaphragm 48 controls a three-way valve 60 deployed to switch interconnection of a flow path 62, 108 connecting to hydraulic control valve actuator chamber 104 between a first state connected to an upstream connection 64 so as to increase pressure in the actuator chamber and displace the plug of the hydraulic control valve towards its closed state, a second state blocking flow so as to maintain the hydraulic control valve in its current state, and a third state for venting pressure via a vent 66 from the hydraulic control valve actuator chamber 104 so as to increase opening of the hydraulic control valve. The preload force in the spring of spring-biased diaphragm 48 is adjusted by a spring adjustment mechanism, typically a threaded adjustment screw or the like, such that, at a desired target pressure of the downstream fluid, three-way valve 60 assumes its second, flow-blocking state, while above-target pressure moves it to the first state and below-target pressure moves it to the third state, thereby achieving pressure regulation at the outlet of the hydraulic control valve. A solenoid 58 may be provided to control an additional valve, for example, a two-way valve 57, to interrupt flow path 62 and connect it directly to upstream connection flow path 64, thereby achieving electrically actuated closure of the control valve. Valve 57, or another valve (not shown) may additionally, or alternatively, have a manual actuation option, not detailed here.

While the above-described pilot valve regulation schemes are not per se novel, the present invention allows pilot valves operating on these principles to be readily and modularly integrated with a hydraulic control valve having only a threaded control socket 106 normally used for simple on/off solenoid control, while providing convenient flexibility about the orientation of the pilot valve relative to the hydraulic control valve, and facilitating rapid connection of the components, optionally without requiring tools.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A pilot valve assembly for connection to a hydraulic control valve, the hydraulic control valve having a cover at least partially enclosing an actuator chamber, the cover having a threaded control socket that provides access to flow channels in fluid flow connection with the actuator chamber of the hydraulic control valve and a downstream connection of the hydraulic control valve, the pilot valve assembly comprising:
    (a) a connector comprising a generally cylindrical body surrounding an internal passageway that extends parallel to an axis of said body, a first end portion of said connector being formed with external threading for engaging the threaded control socket of the hydraulic control valve, a second end of said connector being provided with an array of teeth arrayed around an edge of said second end, a circumferential slot being formed in an external surface of said connector spaced from said second end;
    (b) a pilot valve comprising a mechanism for controlling a pressure within the hydraulic control valve actuator chamber, said pilot valve having a recess configured to mate with said second end of said connector, said recess having a plurality of complementary teeth configured for engaging said array of teeth of said connector in a plurality of angular orientations; and
    (c) a clamping arrangement for engaging said circumferential slot so as to clamp said pilot valve to said second end of said connector with said complementary teeth engaged with said array of teeth, thereby fixing an angular orientation of said pilot valve.

2. The pilot valve assembly of claim 1, wherein said clamping arrangement comprises a forked wedge having two wedge tines for insertion through guide channels formed in said pilot valve so that said wedge tines engage said circumferential slot and progressively tighten said pilot valve against said second end of said connector.

3. The pilot valve assembly of claim 1, wherein said array of teeth are deployed on an axially-facing end surface of said second end of said connector and project axially.

4. The pilot valve assembly of claim 1, wherein said pilot valve further comprises a connector tube projecting from said recess and configured to extend through said internal passageway of said connector to connect to an aperture of the hydraulic control valve control flow path.

5. The pilot valve assembly of claim 1, wherein said pilot valve is a pressure-reducing pilot valve configured to control a pressure within the hydraulic control valve actuator chamber as a function of at least a pressure from the downstream connection.

6. The pilot valve assembly of claim 1, wherein said pilot valve is configured to throttle a flow path from the hydraulic control valve actuator chamber to the downstream connection as a function of at least a pressure in the downstream connection.

7. The pilot valve assembly of claim 1, wherein said pilot valve is configured to switch a flow path to the hydraulic control valve actuator chamber between a first state connected to an upstream connection, a second state preventing flow, and a third state for venting pressure from the hydraulic control valve actuator chamber.

8. The pilot valve assembly of claim 1, wherein said pilot valve is a diaphragm pilot valve.

9. The pilot valve assembly of claim 1, wherein said pilot valve comprises a spring-biased diaphragm biased by a spring, and a spring adjustment mechanism for varying a loading applied to said spring.

* * * * *